DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 7

T903,016
PROCESS FOR PREPARING HIGHER TRIORGANO PHOSPHATE ESTERS

James Perry Cleveland, Rte. 8, Cochise Trail, Kingsport, Tenn. 37664

Filed Oct. 29, 1971, Ser. No. 193,999
Int. Cl. C07f *9/08*
U.S. Cl. 260—982
No Drawing. 8 Pages Specification

The present invention concerns a process for substituting at least one higher organo group such as butyl, for a lower alkyl group of a trialkyl phosphate such as triethyl phosphate, wherein each original alkyl group of the phosphate contains from 1 to 10 carbons, comprising reacting the trialkyl phosphate with an alcohol or substituted alcohol in the presence of from about 2 to about 40 mole percent based on moles of phosphate triester of the alkoxide of the alcohol which is higher in carbons than at least one alkyl group of the phosphate, the reaction being carried out at a temperature of from about 25° C. to about 115° C., and under conditions such that the liberated alcohol is rapidly removed.